Dec. 13, 1927.    
A. GUNTHER  
1,652,894  
GLASS SYRINGE FOR INJECTIONS AND SIMILAR PURPOSES  
Filed Feb. 11, 1927

Inventor  
Alfred Günther  
By  
Attorney

Patented Dec. 13, 1927.

1,652,894

UNITED STATES PATENT OFFICE.

ALFRED GÜNTHER, OF SCHMIEDEFELD, GERMANY.

GLASS SYRINGE FOR INJECTIONS AND SIMILAR PURPOSES.

Application filed February 11, 1927, Serial No. 167,513, and in Germany January 12, 1927.

This invention relates to a glass syringe for injections and other purposes in which a glass piston is fitted into a ground cylinder body on which a scale or scales are marked. This glass syringe is characterized in that the hollow glass piston closed at the lower end by a flat bottom plate is made of coloured glass and is lined on the inner surface with a mirror-foil which is silver or of similar colour so that the mirror foil in combination with the colour of the glass of the piston clearly indicates the position of this piston and specially that of its closed bottom end on the scale or on the scales of the cylinder body, no separate bottom plate of opaque glass of a different colour being fixed by melting on the open end of the piston. The flat bottom of the piston sits tightly on the flat end of the tubular part of the piston body when the piston is pushed home and it closes tightly this end of the cylinder body.

In syringes for injection and similar purposes of known type and which have a measuring scale or measuring scales a glass plate of opaque glass has been fixed by melting on the lower open end of the piston designed for making the position of the piston in the cylinder body visible through the glass wall of the cylinder body. Injection syringes of this type present certain inconveniences. The glass bottom of the piston of opaque glass possesses generally another expanding capability than the transparent glass of which the piston is made, wherefrom results that the bottom plate of opaque glass breaks easily off the piston. In this case the liquid which had been sucked into the syringe penetrates into the piston so that the glass syringe was unfit for use.

It has been proposed to make the piston more visible through the glass wall of the cylinder body by arranging a copper mirror in the piston; the bottom was however not clearly visible so that it was necessary to fix a plate of opaque glass by melting onto the bottom end of the cylinder.

This inconvenience is avoided according to the invention by blowing the hollow piston from coloured, preferably darkish yellow glass and by fitting it with a silver mirror or with a mirror of other colour lining the inner wall of the hollow piston.

Owing to this silver mirror and owing to the yellow colour the piston is clearly visible through the transparent glass wall of the cylinder body and the position of the piston in the cylinder body can be accurately read on the scale or scales as the silver mirror reflects metallically.

In order to avoid dead space in the syringe the bottom of the piston is flat and also the end of the tubular part of the cylinder so that the piston sits tightly upon the flat end of the cylinder and closes the cylinder perfectly.

An embodiment of the invention is illustrated, by way of example, in the accompanying drawings in which:—

Figure 1:
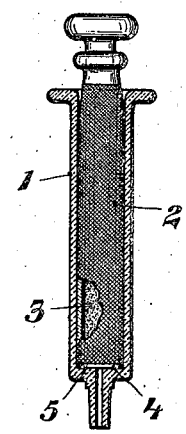
Fig. 1 shows the improved injection syringe in elevation.
Figure 2:
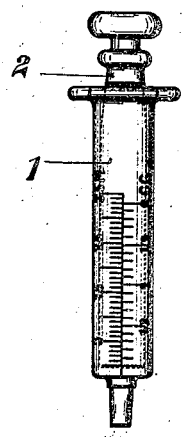
Fig. 2 shows the cylinder body in section and the piston in elevation.

The syringe consists of a cylinder body 1 of transparent glass and of a hollow piston 2 made of coloured, preferably yellow glass and lined in the hollow space 3 with a mirror foil of silver or the like, so that the piston looks as if it were of gold. The inner edge or end can be consequently clearly seen through the transparent glass of the cylinder body and as the glass plate 4 which forms the bottom of the piston is thin plane clear glass the position of the same can be accurately ascertained. That is, there is a very distinct line 4' at the junction of the plate 4 with the end of the gold barrel of the piston, and thus this line coacts with the digits of the scale or graduations and clearly indicates the contents in the space between the bottom 5 of the body 1 and the plate 5 of the cylinder. The bottom plate 4 of the piston is flat, while the end 5 of the tubular portion of the cylinder body is also flat so that the flat piston bottom sits closely on the flat end 5 of the cylinder body without any clearance and tightly closes the end of the cylinder body when the piston has been pushed in.

I claim:

A glass syringe comprising in combination a ground cylinder body of transparent glass on which a measuring scale is marked, and a ground hollow piston of yellow glass, a thin clear plate of glass sealing the end, a silver mirror foil on the inner surface of the hollow piston so that the position whereby the point of demarkation between the end of the colored and mirrored end of the piston and the plate form a distinctive visible index through the body for cooperation with the scale thereon.

In testimony whereof I have hereunto set my hand.

ALFRED GÜNTHER